United States Patent [19]
Willi

[11] Patent Number: 5,186,096
[45] Date of Patent: Feb. 16, 1993

[54] COFFEE BREWING MACHINE

[75] Inventor: Marco Willi, Wetzikon, Switzerland

[73] Assignee: Estro S.r.l., Bergamo, Italy

[21] Appl. No.: 610,415

[22] Filed: Nov. 7, 1990

[30] Foreign Application Priority Data

Nov. 7, 1989 [DE] Fed. Rep. of Germany ....... 3937000

[51] Int. Cl.⁵ .............................................. A47J 31/24
[52] U.S. Cl. ...................................... 99/282; 99/291;
99/299; 219/433; 392/467
[58] Field of Search ................. 99/280, 281, 282, 283,
99/291, 295, 298, 299, 300, 302 R, 304, 305,
306, 307; 426/433; 219/432, 433; 392/441, 442,
467

[56] References Cited
U.S. PATENT DOCUMENTS

| | | | |
|---|---|---|---|
| 3,485,162 | 12/1969 | Hopkinson | 99/283 |
| 4,242,568 | 12/1980 | Wunderlin | 99/280 |
| 4,418,614 | 12/1983 | Oota | 99/280 |
| 4,468,406 | 8/1984 | d'Alayer | 99/280 |
| 4,484,515 | 11/1984 | Illy | 99/282 |
| 4,608,916 | 9/1986 | Becker | 99/283 |
| 4,653,390 | 3/1987 | Hayes | 392/467 |
| 4,667,584 | 5/1987 | Koyama | 99/280 |
| 4,713,526 | 12/1987 | Smit | 99/283 |
| 4,744,291 | 5/1988 | Wallin | 99/280 |
| 4,858,523 | 8/1989 | Helbling | 99/280 |
| 5,014,611 | 5/1991 | Illy | 99/280 |

Primary Examiner—Harvey C. Hornsby
Assistant Examiner—Terrence R. Till
Attorney, Agent, or Firm—Tarolli, Sundheim & Covell

[57] ABSTRACT

The coffee brewing machine can be used to prepare alternatively normal coffee or espresso coffee and comprises a boiler having a temperature control. The cold water is fed to the boiler by a water pump with adjustable feed rate. Two different brewing members are used for the preparation of the two kind of coffees, namely a sieve holder and a filter support which are connectable via a mounting and supporting flange to the boiler. A mode switch is assigned to the mounting and supporting flange which automatically changes the mode of operation of the coffee brewing machine upon exchanging the brewing member. Thereby, the feed rate of the water pump and the temperature of the hot water are adapted to optimize the conditions for preparing either normal coffee or espresso coffee.

4 Claims, 2 Drawing Sheets

COFFEE BREWING MACHINE

BACKGROUND OF THE INVENTION

1. Field of the Invention

The present invention refers to a coffee brewing machine for preparing, alternatively, espresso coffee by a method in which hot water is forced under pressure through a compressed cake of coffee powder, or normal coffee by a method in which hot water runs without pressure through a filter containing coffee powder.

2. Prior Art

In known coffee brewing machines of this kind, practically two separate, different coffee brewing machines are united in one common housing: Firstly a coffee brewing machine for preparing normal coffee which obtains the fresh cold water from a common or a separate water tank or container. The fresh cold water is heated by a boiler or a geyser up to a temperature near the boiling point such that the hot water may flow through a pipe in a filter holder which has been provided with coffee powder. By flowing through the filter holder, the hot water is brewed up to coffee. Secondly a coffee brewing machine for preparing espresso coffee by a method by which hot water is forced under pressure through a compressed cake of coffee powder. In this machine, the fresh cold water is sucked from the same or a separate water tank or container by a pump and fed through a boiler or a geyser where it is heated up to the desired temperature to a brewing chamber filled with compressed coffee powder. The pressurized hot water penetrates the coffee powder cake and leaves the brewing chamber as espresso coffee.

Disadvantages of these known machines are that the constructional expenditure is very high since, for instance, two separate elements for heating up the water and two separate, differently located coupling elements, i.e. for the filter holder and for the brewing chamber which both have to be removably fixed, must be provided, and that the space requirements of such machines are very high.

Based on the knowledge that for preparing normal coffee on the one hand and for preparing espresso coffee on the other hand the feed rate of the hot water per time unit as well as the temperature thereof have to be adapted, it has been proposed in the German Auslegeschrift Nr. 1,778,604 to render variable the feed rate of &he pump which feeds the hot water or the heating power of the boiler or geyser. Even if thereby the possibility is given to adapt the parameters of operation of the coffee brewing machine manually, there is a great danger that the coffee brewing machine is incorrectly operated.

OBJECTS OF THE INVENTION

It is an object of the present invention to provide a coffee brewing machine for preparing alternatively normal coffee or espresso coffee which is simpler in design than known machines of this kind.

It is a further object of the present invention to provide a coffee brewing machine for preparing alternatively normal coffee or espresso coffee which is more reliable in operation than known machines of this kind by eliminating any possibility of incorrect handling.

Particularly, it is an object of the present invention to provide a coffee brewing machine for preparing alternatively normal coffee or espresso coffee which is in a position to deliver both kinds of coffee using the same water heater and the same water feeder without the need for the operating person to change any operational parameters before starting to prepare the desired kind of coffee.

SUMMARY OF THE INVENTION

The invention provides a coffee brewing machine for preparing, alternatively, espresso coffee by a method in which hot water is forced under pressure through a compressed cake of coffee powder, or normal coffee by a method in which hot water runs without pressure through a filter containing coffee powder. The machine of the invention comprises a tank or container for cold fresh water and a heater for heating the cold water once it has pumped out of the tank or container.

A first brewer in the form of a brewing chamber is provided and adapted to receive the aforementioned cake of coffee powder, and a second brewer is provided and adapted to receive the aforementioned filter containing coffee powder.

The coffee brewing machine of the invention further comprises a support to which the aforementioned first and second brewers can be connected alternatively. A water pump serves for feeding the cold fresh water from the tank or container to the heater and therefrom to the aforementioned support.

The heater is switchable to alternatively heat the cold fresh water, in a first mode of operation, to a first lower temperature or, in a second mode of operation, to a second higher temperature. The water pump is switchable to alternatively feed the water, in a first mode of operation, with a first higher feed rate or, in a second mode of operation, with a second lower feed rate.

Further, a switch is provided for switching the heater and the water pump from the first mode of operation over to the second mode of operation and vice versa whereby the switch is automatically activated upon connecting the first brewer or the second brewer to the support such that the heater and the water pump are operating in the first mode of operation when the first brewer is connected to the support, i.e. when espresso coffee is to be prepared, and the heater and the water pump are operating in the second mode of operation when the second brewer is connected to the support, i.e. when normal coffee is to be prepared.

In short, thus, the invention provides thereby that the switch automatically adapt the mode of operation of the coffee brewing machine depending on the type of brewer inserted into the machine. Thereby, the operation of such a coffee brewing machine is substantially simplified because the operator has not to change any operational parameters of the machine upon changing from one mode of operation (e.g. espresso coffee) to the other mode of operation (e.g. normal coffee) or vice versa.

In practice, this goal can be achieved for instance by the provision that the support adapted to receive alternatively a filter holder and a brewing chamber containing a compressed cake of coffee powder, and that the switch is assigned to the support which switch takes a first switching condition when the filter holder is inserted into the machine and a second switching condition when the brewing chamber is inserted into the machine.

In a preferred embodiment of the coffee brewing machine of the invention the first and the second brewers have different sizes in a certain dimension whereby the switch comprises an axially movable pin member serving as a switch actuator. The switch is located such that the pin member is axially displaced only when the brewer having a greater size is connected to the support to bring the switch from a first switching position to a second switching position.

For instance, the second brewer, i.e. the filter holder, can have a greater diameter than the first brewer, i.e. the sieve holder or brewing chamber; this is usually true in connection with brewers hitherto used. In this case, the pin member of the switch is arranged in the region of the periphery of the brewer that it is actuated when the second brewer, i.e. the filter holder, is inserted into the machine.

The two modes of operation differ mainly with reference to the feed rate of the water pump and the temperature of the water contained in the water heater. Thus, preferably, the switch, upon its actuation, effects a change of the initial setting of at least those controls which determine the feed rate of the water pump and the water temperature of the water in the heater.

In a preferred embodiment, the setting of the controls is such that, in said first mode of operation, the water pump operates with full power and the temperature of the water in the heater is kept at about 85° to 90° C., while in the second mode of operation the feed rate of the water pump is reduced, e.g. to approximately 20% of the full power feed rate, and the temperature of the water in the heater is raised to about 95° C.

If the coffee brewing machine of the invention comprises additionally a heating plate serving as a support for a coffee pot which is to collect normal coffee in the second mode of operation, the mode switch can also control the power supply to this heating plate, preferably such that the heating plate is switched off during the first mode of operation, i.e. during the preparation of espresso coffee, and switched on during and after the second mode of operation, i.e. during and after the preparation of normal coffee as long as the filter holder is inserted into the machine.

Furthermore, an arrangement can be provided to manually adjust the feed rate of the water pump in order to adjust the strength of the prepared coffee, and additionally an arrangements for preselecting the number of desired coffee portions.

BRIEF DESCRIPTION OF THE DRAWINGS

In the following, an embodiment of the coffee brewing machine according to the invention will be further described, with reference to the accompanying drawings, in which.

DESCRIPTION OF A PREFERRED EMBODIMENT

Figure 1:
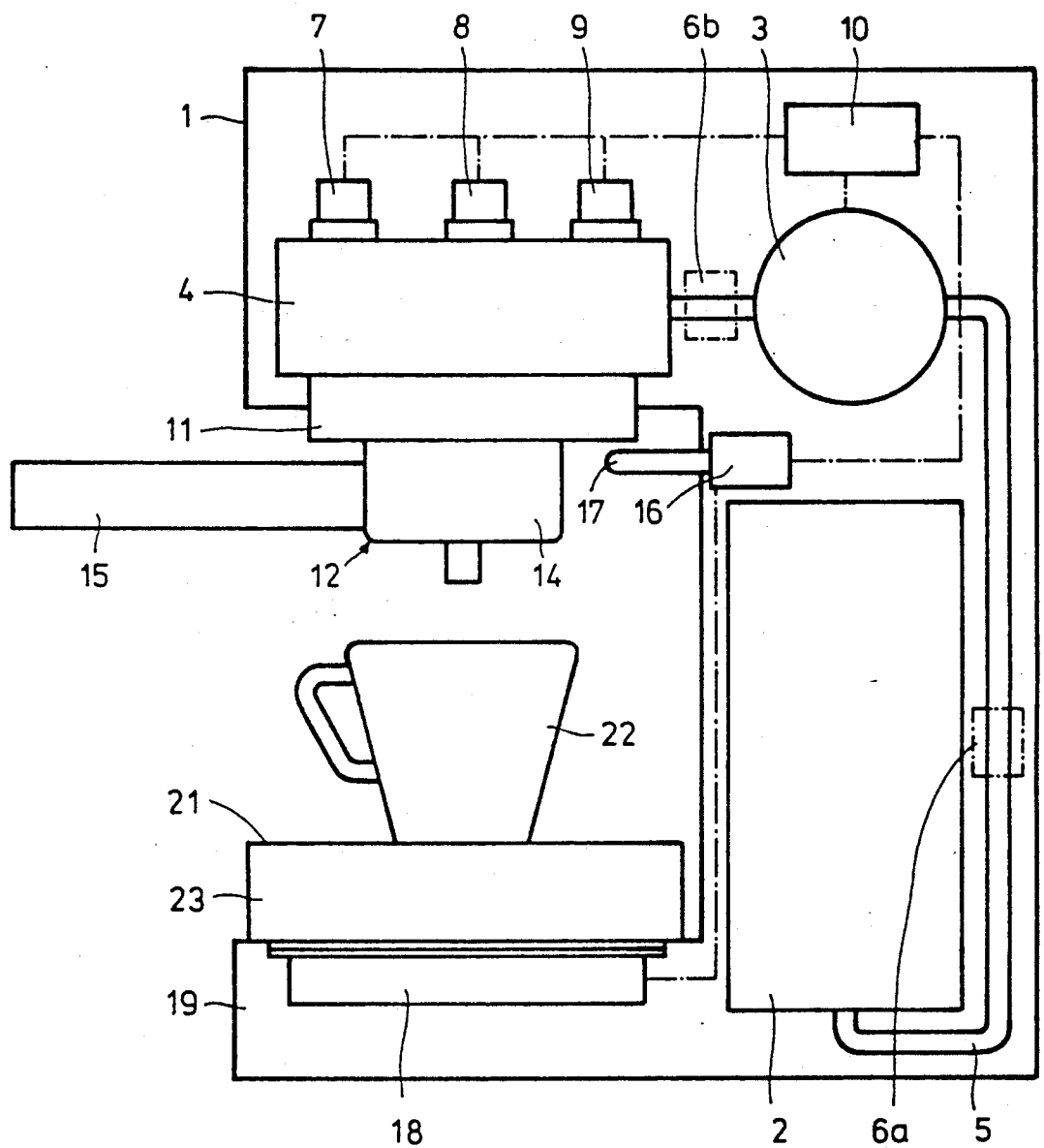
FIG. 1 shows a schematic side view of an embodiment of a coffee brewing machine in its first mode of operation, i.e. for preparing espresso coffee by a method in which hot water is forced under pressure through a compressed cake of coffee powder.
Figure 2:
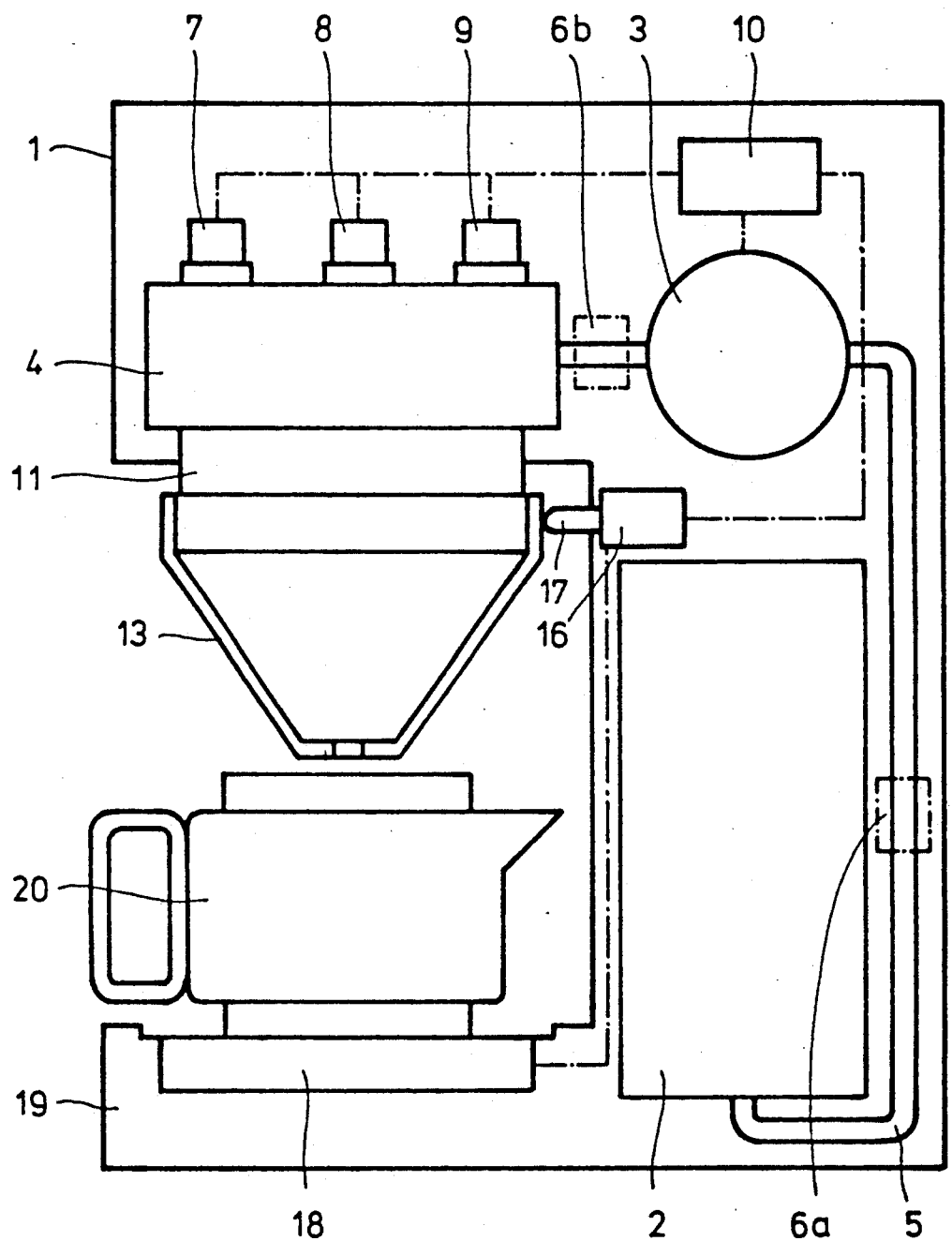
FIG. 2 shows a schematic side view of an embodiment of a coffee brewing machine in its second mode of operation, i.e. for preparing normal coffee by a method in which hot water runs without pressure through a filter containing coffee powder.

The coffee brewing machine shown in FIGS. 1 and 2 comprises a housing 1 containing a container 2 adapted to receive cold fresh water, a water pump 3 the feed rate of which being adjustable, and an electrically operated boiler 4 incorporating an arrangement for adjusting the temperature to which the water is heated. The required amount of cold fresh water is fed from the container 2 to the boiler 4 by the water pump 3 through connecting pipes 5. If appropriate, the pipe 5 may be equipped with a regulating valve 6a and 6b, respectively, in order to control the flow speed of the water circulating in the pipe 5. As shown in FIGS. 1 and 2 in dash-dot lines, either a regulating valve 6a can be provided in the pipe section 5 between the container 2 and the water pump 3, or a regulating valve 6b can be provided in the pipe section 5 between the water pump 3 and the boiler 4.

The boiler 4 is equipped with three thermostats 7, 8 and 9. The thermostat 7, for example, is effective in the first mode of operation, i.e. for preparing espresso coffee by a method in which hot water is forced under pressure through a compressed cake of coffee powder, and is adjusted to keep the temperature of the water contained in the boiler 4 at about 85° to 90° C. The thermostat 8 is effective in the second mode of operation, i.e. for preparing normal coffee by a method in which hot water runs without pressure through a filter containing coffee powder, and is adjusted to keep the temperature of the water contained in the boiler 4 at about 95° C. The thermostat 9 is provided for a third mode of operation which must not be discussed here since it is not essential for the present invention, namely for the preparation of hot steam.

Further, there is provided a control unit 10 connected to the three thermostats 7, 8 and 9, to the water pump 3 and to a mode switch 16 which latter will be discussed in detail hereinbelow.

The coffee brewing machine further comprises a mounting and supporting flange 11; thereto, one of two brewing members can be connected, depending on the mode of operation which is desired. Upon connecting a brewing member to the mounting and supporting flange 11, it will be supplied with hot water from the boiler 4 since the mounting and supporting flange 11 constitutes the bottom cover plate of the boiler 4. Particularly, the mounting and supporting flange 11 fixed to the boiler 4 is adapted to receive a first brewing member in the form of a sieve holder 12, as shown in FIG. 1, and a second brewing member in the form of a coffee filter support member 13, as shown in FIG. 2. In order to fix the sieve holder 12, which essentially consists of a sieve-like brewing chamber 14 provided with a handle 15, to the mounting and supporting flange 11, a feature is provided which is not shown in the drawing and which is well known to any person skilled in the art, e.g. some sort of bayonet catch. For mounting the coffee filter support member 13 according to FIG. 2, the lower side of the mounting and supporting flange 11 may comprise, for example, a horizontally running slide guidance (not shown), and the upper side of the coffee filter support member 13 may be provided with horizontally extending slide ribs (not shown); thereby, the coffee filter support member 13 may be fixed to the lower side of the mounting and supporting flange 11 by a lateral sliding motion.

A mode switch 16 is assigned to the mounting and supporting flange 11. The mode switch 16 preferably may be in the form of a micro switch. As already mentioned, the mode switch 16 is electrically connected to the control unit 10. The mode switch 16 comprises a axially displaceable pin member 17 which is kept in its most protruding position by a spring (not shown). In this rest position of the pin member 17, the mode switch is in one of its two switching conditions. If the pin member 17 is axially displaced inwardly, the mode switch is in its other switching condition.

The mode switch 16 is located somewhat below the lower surface of the mounting and supporting flange 11, as can be clearly seen from the drawings, whereby the pin member 17 radially extends towards the center of the mounting and supporting flange 11.

As can further be seen from the drawings, the sieve-like brewing chamber 14 of the sieve holder 12 (shown in FIG. 1) has a smaller diameter than the coffee filter support member 13 (shown in FIG. 2). The radial distance of the mode switch 16 from the center of the mounting and supporting flange 11 is such that the sieve-like brewing chamber 14 of the sieve holder 12 does not touch the tip of the pin member 17 once the sieve holder 12 is connected to the mounting and supporting flange 11. Thus, the mode switch 16 is not actuated and the control unit is adjusted such that, under these circumstances, the coffee brewing machine is operating in its first mode of operation, i.e. for preparing espresso coffee with a water temperature of about 85° to 90° C. and with full feed power of the water pump 3.

As already mentioned, the coffee filter support member 13 has a greater diameter than the sieve-like brewing chamber 14 of the sieve holder 12. Thus, if the coffee filter support member 13 is connected to the mounting and supporting flange 11, as shown in FIG. 2, the outer periphery of the coffee filter support member 13 touches the tip of the pin member 17 and pushes it axially back such that the mode switch changes from the first switching condition to the second switching condition. This signal is fed to the control unit 10 which causes the coffee brewing machine to change into its second mode of operation for preparing normal coffee, whereby the temperature of the water in the boiler 4 raises to about 95° C. and whereby the feed rate of the water pump 3 is reduced.

The coffee brewing machine is further provided with a electrically heatable plate 18 which is located in the lower protruding part 19 of the housing 1 of the coffee brewing machine and which serves to receive a coffee pot 20 collecting the normal coffee when the coffee brewing machine is in its second mode of operation. The heatable plate 18 needs to be powered only in this second mode of operation, shown in FIG. 2, when normal coffee is going to be prepared. The switching on and off of the heatable plate 18 is controlled by the mode switch 16 as well. When the coffee brewing machine is in its first mode of operation, the heatable plate 18 is switched off and a separate support member 21 for a coffee cup 22 is used. The support member 21 is provided with a collecting tub 23 which can be put onto the protruding lower part 19 of the coffee brewing machine.

What I claim is:

1. A coffee brewing machine for preparing espresso coffee in a first mode of operation when hot water is forced under pressure through a compressed cake of coffee powder and for preparing normal coffee in a second mode of operation when hot water runs without pressure through a filter containing coffee powder, said machine comprising:

first brewing means including a sieve holder for receiving a compressed cake of coffee powder;

second brewing means including a coffee filter support member for receiving a filter containing coffee powder;

an electrically operable boiler for heating water including thermostat means for enabling adjustment of the temperature to which the water in said boiler is to be heated, said boiler being operable in (i) a first mode of operation in which cold fresh water is heated to a first lower temperature of about between 85° C. and 90° C., and (ii) a second mode of operation in which cold fresh water is heated to a second higher temperature of about 95° C.;

supporting means connected to said boiler and to which said first and second brewing means can be connected alternatively;

a container adapted to receive cold fresh water;

a water pump having an adjustable feed rate and for feeding cold fresh water from said container to said boiler and therefrom to said supporting means, said water pump including feed rate adjusting means for enabling adjustment of the feed rate at which water through said water pump is to flow, said water pump being operable in (i) a first mode of operation in which said water pump feeds water to said boiler at a first higher feed rate, and (ii) a second mode of operation in which said water pump feeds water to said boiler at a second lower feed rate;

a mode switch including a pin member axially displaceable between a first switching position corresponding to the first mode of operation of said machine to prepare espresso coffee and a second switching position corresponding to the second mode of operation of said machine to prepare normal coffee, said pin member being in said first switching position when said sieve holder of said first brewing means is connected to said supporting means, said pin member being in said second switching position when said coffee filter support member of said second brewing means is connected to said supporting means; and a control unit for (i) monitoring the position of said pin member of said mode switch, (ii) controlling said thermostat means to adjust the temperature of the water in said boiler, and (iii) controlling said feed rate adjusting means to adjust the feed rate of the water flow through said water pump;

said control unit controlling said thermostat means to control the temperature of the water in said boiler and said feed rate adjusting means to control the feed rate of the water flow through said water pump in response to the position of said pin member of said mode switch, said water pump being in its first mode of operation in which said water pump feeds water from said container to said boiler at said first higher feed rate and said boiler being in its first mode of operation in which the water in said boiler is heated to said first lower temperature of about between 85° C. and 90° C. to thereby prepare espresso coffee when said pin member of said mode switch is in its first switching position corresponding to the first mode of operation of said machine, said water pump being in its second mode of operation in which said water pump feeds water from said container to said boiler at said second lower feed rate and said boiler being in its second mode of operation in which the water in said boiler is heated to said second higher temperature of about 95° C. to thereby prepare normal coffee when said pin member of said mode switch is in its second switching position corresponding to the second mode of operation of said machine.

2. A coffee brewing machine for preparing espresso coffee in a first mode of operation when hot water is forced under pressure through a compressed cake of coffee powder and for preparing normal coffee in a second mode of operation when hot water runs without pressure through a filter containing coffee powder, said machine comprising:

first brewing means including a sieve holder for receiving a compressed cake of coffee powder;

second brewing means including a coffee filter support member for receiving a filter containing coffee powder;

an electrically operable boiler for heating water including thermostat means for enabling adjustment of the temperature to which the water in said boiler is to be heated, said boiler being operable in (i) a first mode of operation in which cold fresh water is heated to a first lower temperature of about between 85° C. and 90° C., and (ii) a second mode of operation in which cold fresh water is heated to a second higher temperature of about 95° C.;

supporting means connected to said boiler and to which said first and second brewing means can be connected alternatively;

a container adapted to receive cold fresh water;

a water pump having an adjustable feed rate and for feeding cold fresh water from said container to said boiler and therefrom to said supporting means, said water pump including feed rate adjusting means for enabling adjustment of the feed rate at which water through said water pump is to flow, said water pump being operable in (i) a first mode of operation in which said water pump feeds water to said boiler at a first higher feed rate, and (ii) a second mode of operation in which said water pump feeds water to said boiler at a second lower feed rate;

a mode switch including a pin member axially displaceable between a first switching position corresponding to the first mode of operation of said machine to prepare espresso coffee and a second switching position corresponding to the second mode of operation of said machine to prepare normal coffee, said pin member being in said first switching position when said sieve holder of said first brewing means is connected to said supporting means, said pin member being in said second switching position when said coffee filter support member of said second brewing means is connected to said supporting means;

a heatable surface adapted to support a pot member serving to collect the coffee brewed by the second mode of operation of said machine in which hot water runs without pressure through said filter containing coffee powder, said heatable surface being switchable on and off, said heatable surface being switched off when said pin member of said mode switch is in said first switching position and switched on when said pin member of said mode switch is in said second switching position; and a control unit for (i) monitoring the position of said pin member of said mode switch, (ii) controlling said thermostat means to adjust the temperature of the water in said boiler, and (iii) controlling said feed rate adjusting means to adjust the feed rate of the water flow through said water pump;

said control unit controlling said thermostat means to control the temperature of the water in said boiler and said feed rate adjusting means to control the feed rate of the water flow through said water pump in response to the position of said pin member of said mode switch, said water pump being in its first mode of operation in which said water pump feeds water from said container to said boiler at said first higher feed rate and said boiler being in its first mode of operation in which the water in said boiler is heated to said first lower temperature of about between 85° C. and 90° C. to thereby prepare espresso coffee when said pin member of said mode switch is in its first switching position corresponding to the first mode of operation of said machine, said water pump being in its second mode of operation in which said water pump feeds water from said container to said boiler at said second lower feed rate and said boiler being in its second mode of operation in which the water in said boiler is heated to said second higher temperature of about 95° C. to thereby prepare normal coffee when said pin member of said mode switch is in its second switching position corresponding to the second mode of operation of said machine.

3. A coffee brewing machine according to claim 1 wherein said first and second brewing means have different sizes in a certain dimension, said mode switch being located such that said pin member is axially displaced only when the brewing means having a greater size is connected to said supporting means.

4. A coffee brewing machine according to claim 3 wherein said second brewing means has a greater diameter than said first brewing means, said mode switch being located such that said pin member radially extends towards said first and second brewing means, respectively, when it is connected to said supporting means.

* * * * *